US012629729B2

(12) United States Patent
Nishimori et al.

(10) Patent No.: US 12,629,729 B2
(45) Date of Patent: May 19, 2026

(54) COATING FILM REMOVING EQUIPMENT AND COATING FILM REMOVING METHOD

(71) Applicant: Toray Industries, Inc., Chuo-ku (JP)

(72) Inventors: Yutaka Nishimori, Otsu (JP); Kiyoshi Tanino, Otsu (JP)

(73) Assignee: Toray Industries, Inc, Tokyo (JP)

( * ) Notice: Subject to any disclaimer, the term of this patent is extended or adjusted under 35 U.S.C. 154(b) by 72 days.

(21) Appl. No.: 18/838,036

(22) PCT Filed: Jan. 12, 2023

(86) PCT No.: PCT/JP2023/000619
§ 371 (c)(1),
(2) Date: Aug. 13, 2024

(87) PCT Pub. No.: WO2023/162495
PCT Pub. Date: Aug. 31, 2023

(65) Prior Publication Data
US 2025/0196198 A1 Jun. 19, 2025

(30) Foreign Application Priority Data

Feb. 24, 2022 (JP) ................................. 2022-026411

(51) Int. Cl.
B08B 3/04 (2006.01)
B08B 3/14 (2006.01)
(Continued)

(52) U.S. Cl.
CPC ................ B08B 3/041 (2013.01); B08B 3/14 (2013.01); B08B 1/165 (2024.01); B08B 3/022 (2013.01);
(Continued)

(58) Field of Classification Search
CPC ........... B08B 3/041; B08B 5/04; B08B 1/165; B08B 3/022; B08B 3/14; B08B 5/046;
(Continued)

(56) References Cited

U.S. PATENT DOCUMENTS

| | | | |
|---|---|---|---|
| 5,855,325 A | 1/1999 | Hofmann et al. | |
| 2001/0008170 A1* | 7/2001 | yamamoto | B29B 17/02 156/760 |

FOREIGN PATENT DOCUMENTS

| | | | | |
|---|---|---|---|---|
| CN | 102139553 A | * | 8/2011 | |
| CN | 104513978 B | * | 6/2016 | C23C 22/73 |

(Continued)

OTHER PUBLICATIONS

International Search Report (PCT/ISA/210) with translation and Written Opinion (PCT/ISA/237) mailed Mar. 7, 2023, by the Japan Patent Office as the International Searching Authority for International Application No. PCT/JP2023/000619. (8 pages).

(Continued)

*Primary Examiner* — Benjamin L Osterhout
(74) *Attorney, Agent, or Firm* — Buchanan Ingersoll & Rooney PC

(57) ABSTRACT

Provided is a coating film removing equipment that is a device including: a cleaning tank; a supply device configured to supply a cleaning liquid to the cleaning tank; a conveyance device configured to convey a coated film in a longitudinal direction of the coated film such that the coated film passes through the cleaning tank; a suction box that is disposed in the cleaning tank and surrounds a part of a conveyance path of the coated film with a gap through which a film can pass; a removing mechanism disposed in the suction box, the removing mechanism being configured to remove a coating film from the coated film; and a discharge device for discharging the cleaning liquid and the removed (Continued)

coating film from the suction box to an outside of the cleaning tank.

8 Claims, 5 Drawing Sheets

(51) Int. Cl.

| | |
|---|---|
| *B08B 1/16* | (2024.01) |
| *B08B 3/02* | (2006.01) |
| *B08B 5/04* | (2006.01) |
| *B29B 17/02* | (2006.01) |
| *B29C 63/00* | (2006.01) |
| *B29L 7/00* | (2006.01) |
| *B29L 9/00* | (2006.01) |

(52) U.S. Cl.
CPC ................. *B08B 5/04* (2013.01); *B08B 5/046* (2013.01); *B08B 2203/0229* (2013.01); *B08B 2220/00* (2013.01); *B29B 17/02* (2013.01); *B29B 2017/022* (2013.01); *B29B 2017/0289* (2013.01); *B29C 63/0013* (2013.01); *B29L 2007/008* (2013.01); *B29L 2009/005* (2013.01); *Y02W 30/62* (2015.05)

(58) Field of Classification Search
CPC ........ B08B 2203/0229; B08B 2220/00; B29B 17/02; B29B 2017/022; B29B 2017/0289; B29C 63/0013; B29L 2007/008; B29L 2009/005; Y02W 30/62
See application file for complete search history.

(56) References Cited

FOREIGN PATENT DOCUMENTS

| | | | | | |
|---|---|---|---|---|---|
| CN | 110435044 | A | | 11/2019 | |
| EP | 0745899 | A1 | | 12/1996 | |
| JP | S62238710 | A | | 10/1987 | |
| JP | H08244034 | A | * | 9/1996 | |
| JP | H1015528 | A | | 1/1998 | |
| JP | H1036997 | A | * | 2/1998 | .............. C25D 5/56 |
| JP | 2000000888 | A | * | 1/2000 | |
| JP | 2002154742 | A | * | 5/2002 | |
| JP | 2004363140 | A | | 12/2004 | |
| JP | 2006099855 | A | * | 4/2006 | |
| JP | 2007270113 | A | | 10/2007 | |
| JP | 2013159094 | A | | 8/2013 | |
| JP | 2020-001262 | A | | 1/2020 | |
| JP | 2020147401 | A | * | 9/2020 | |
| JP | 2021009203 | A | * | 1/2021 | ......... G02B 27/0006 |
| JP | 2021187869 | A | * | 12/2021 | |
| KR | 20150092481 | A | * | 8/2015 | ............ B29B 17/02 |
| KR | 101548180 | B1 | * | 9/2015 | ............ B29B 17/02 |
| KR | 102408412 | B1 | * | 6/2022 | ............ B29B 17/00 |
| WO | WO-9316963 | A1 | * | 9/1993 | ............ C03B 19/12 |
| WO | WO-2023106002 | A1 | * | 6/2023 | ............ B29B 17/02 |

OTHER PUBLICATIONS

Extended European Search Report issued Jan. 20, 2026, by the European Patent Office In corresponding European Patent Application No. 23759501.2-1015. (7 pages).

* cited by examiner

FIG.5

COATING FILM REMOVING EQUIPMENT AND COATING FILM REMOVING METHOD

CROSS REFERENCE TO RELATED APPLICATIONS

This application is the U.S. National Phase of PCT/JP2023/000619, filed Jan. 12, 2023 which claims priority to Japanese Patent Application No. 2022-026411, filed Feb. 24, 2022, the disclosures of these applications being incorporated herein by reference in their entireties for all purposes.

FIELD OF THE INVENTION

The present invention relates to a coating film removing equipment and a coating film removing method capable of efficiently removing a coating film on a surface of a thermoplastic resin film.

BACKGROUND OF THE INVENTION

While a plastic is used in various fields, a plastic such as a microplastic is considered to be a cause of marine pollutions, and reduction of environmental load by a plastic is urgently needed.

In recent years, with evolution of Internet of Things (IoT), the number of electronic devices mounted on computers and smartphones, such as CPU, has increased, and as a result, the number of multilayer ceramic capacitors (MLCCs) required to drive the electronic devices has also rapidly increased. A general method for manufacturing this MLCC includes a step of forming a ceramic green sheet layer on a release film obtained by forming a release layer on a plastic base film using the release film as a carrier sheet, and a step of removing the ceramic green sheet layer to form a ceramic green sheet. In these steps, the release film from which ceramic green sheet has been removed is discarded as an unnecessary material.

That is, an increase in the number of release films as a waste due to a rapid increase in the number of manufactured MLCCs in recent years is an environmental problem, and efforts for reuse of a base film have been activated. In order to reuse the discarded release film, it is only required to obtain a regenerated film by collecting the release film, pulverizing the collected release film, forming the pulverized release film into resin chips, and then remelting the resin chips to form a film.

However, a component of a release layer contained in the release film generally has a different composition from a component constituting the base film from a viewpoint of releasability. Therefore, when the release film with the release layer is remelted as it is to form a regenerated film, the component of the release layer is present as a foreign substance, and therefore stable film formation cannot be performed.

As a method for removing a release component from a release film, Patent Literature 1 discloses a method in which a release film including a water-soluble resin layer formed between a base film and a release layer is immersed in a warm water tank for two seconds or more, and then a surface of the release film is rubbed with a brush roll to remove the release layer.

PATENT LITERATURE

Patent Literature 1: JP 2004-363140 A

SUMMARY OF THE INVENTION

However, the coating film removing method disclosed in Patent Literature 1 may cause a problem that a coating film removed by the brush roll is reattached to a release film being conveyed and is conveyed to a subsequent step, and the coating film is mixed into a collected film or contaminates a roll in the subsequent step.

In addition, the coating film removing method disclosed in Patent Literature 1 may cause a problem that a water-soluble resin removed by the brush roll floats in the warm water tank, the water-soluble resin is dissolved in warm water, a resin concentration in the warm water increases with lapse of a removing treatment time, and initial removing ability cannot be continuously exhibited.

Since these problems occur more significantly as a film conveyance speed increases, it is necessary to periodically clean the device, to reduce the film conveyance speed, to shorten the length of the film to be treated at one time, and the like in order to solve the problems. In this case, removing treatment ability per unit time is largely reduced, and the removing treatment cannot be efficiently performed.

Therefore, an object of the present invention is to provide a coating film removing equipment that removes a coating film from a traveling equipment and a coating film removing method, the device and the method suppressing reattachment of a removed film to a base film and deterioration of removing ability due to elution of at least a part of a coating film component into a cleaning liquid even when the amount of the removed coating film increases due to lapse of a removing treatment time or an increase in film conveyance speed.

A coating film removing equipment of the present invention that solves the above problems is a coating film removing equipment for removing a coating film from a coated film including the coating film on at least one surface of a base film, and includes:

- a cleaning tank;
- a supply device configured to supply a cleaning liquid to the cleaning tank;
- a conveyance device configured to convey the coated film in a longitudinal direction of the coated film such that the coated film passes through the cleaning tank;
- a suction box disposed in the cleaning tank, the suction box being configured to surround a part of a conveyance path of the coated film with a gap through which a film can pass;
- a removing mechanism in which at least an edge in contact with the coated film is disposed in the suction box, the removing mechanism being configured to remove the coating film from the coated film; and
- a discharge device for discharging the cleaning liquid and the removed coating film from the suction box to an outside of the cleaning tank.

In the coating film removing equipment of the present invention, preferably, the discharge device includes a removal device for removing a foreign substance from a discharge liquid, and is configured to supply the discharge liquid from which the foreign substance has been removed to the cleaning tank.

A coating film removing equipment according to another aspect of the present invention that solves the above problems is a coating film removing equipment for removing a coating film from a coated film including the coating film on at least one surface of a base film, and includes:

- two or more cleaning tanks disposed side by side in a conveyance direction of the coated film;

a supply device configured to supply a cleaning liquid to at least the cleaning tank disposed most downstream in the conveyance direction;

a conveyance device configured to convey the coated film in a longitudinal direction of the coated film such that the coated film sequentially passes through the cleaning tanks;

suction boxes each disposed in each of the cleaning tanks, each suction box being configured to surround a part of a conveyance path of the coated film with a gap through which a film can pass;

removing mechanisms each in which at least an edge in contact with the coated film is disposed in each of the suction boxes, each removing mechanism being configured to remove the coating film from the coated film; and discharge devices each for discharging the cleaning liquid and the removed coating film from each of the suction boxes to an outside of each of the cleaning tanks, wherein at least one of the discharge devices includes a removal device for removing a foreign substance from a discharge liquid, and is configured to supply the discharge liquid from which the foreign substance has been removed to another cleaning tank disposed on an upstream side of the cleaning tank including the discharge device in the conveyance direction.

A coating film removing method of the present invention that solves the above problems is a coating film removing method for removing a coating film from a coated film including the coating film on at least one surface of a base film, and includes:

supplying a cleaning liquid to a cleaning tank;

conveying the coated film in a longitudinal direction of the coated film such that the coated film passes through the cleaning liquid;

introducing the coated film into a suction box disposed in the cleaning liquid, the suction box having a gap through which a film can pass, and removing the coating film by a coating film removing mechanism in the suction box; and discharging the cleaning liquid and the removed coating film in the suction box to an outside of the cleaning tank.

In the coating film removing method of the present invention, preferably, a foreign substance is removed from the discharge liquid discharged from the suction box, and then the discharge liquid from which the foreign substance has been removed is supplied to the cleaning tank.

A coating film removing method according to another aspect of the present invention that solves the above problems is a method for removing a coating film from a coated film including the coating film on at least one surface of a base film, and includes:

disposing two or more cleaning tanks side by side in a conveyance direction of the coated film;

supplying a cleaning liquid to at least the cleaning tank disposed most downstream in the conveyance direction;

conveying the coated film in a longitudinal direction of the coated film such that the coated film sequentially passes through the cleaning liquid in the cleaning tanks;

introducing the coated film into suction boxes each disposed in the cleaning liquid in each of the cleaning tanks, each suction box having a gap through which a film can pass, and removing the coating film by a coating film removing mechanism in the suction box;

discharging the cleaning liquid and the removed coating film in each of the suction boxes to an outside of each of the cleaning tanks; and removing a foreign substance from a discharge liquid discharged from at least one of the suction boxes, and then supplying the discharge liquid from which the foreign substance has been removed to another cleaning tank disposed on an upstream side of the cleaning tank including the at least one of suction boxes in the conveyance direction.

In the coating film removing method of the present invention, a discharge amount of the discharge liquid from the suction box is preferably set such that a flow rate of the cleaning liquid at the gap through which the coated film in the suction box goes out is higher than a conveyance speed of the coated film.

Next, meanings of terms in the present invention will be described.

The "gap through which a film can pass" refers to both a gap through which the coated film passes and a gap through which a base film obtained by removing a coating film from the coated film passes.

The "discharge liquid" refers to a cleaning liquid discharged from the suction box and a removed coating film.

The "foreign substance" refers to a coating film removed from the coated film.

Advantageous Effects of Invention

According to the coating film removing equipment and the coating film removing method of the present invention, when a coating film is removed from a surface of a coated film including the coating film on at least one surface of a base film, it is possible to suppress reattachment of a removed coating film to the base film and deterioration of removing ability due to elution of at least a part of a coating film component into a cleaning liquid.

BRIEF DESCRIPTION OF DRAWINGS

FIG. 5 is a schematic view of a coating film removing equipment 301 according to a third embodiment of the present invention.

DETAILED DESCRIPTION OF EMBODIMENTS OF THE INVENTION

Figure 1:
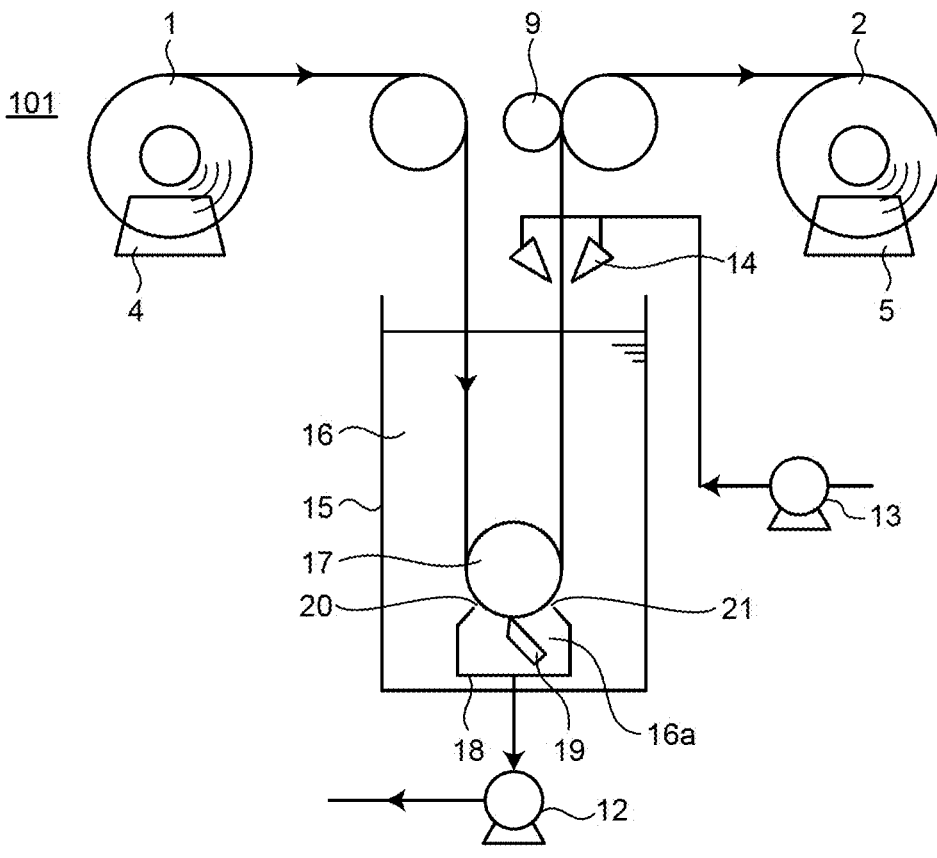
FIG. 1 is a schematic view of a coating film removing equipment 101 according to a first embodiment of the present invention.

The present inventors have intensively studied a method for suppressing reattachment of a removed coating film to a base film and deterioration of removing ability due to elution of at least a part of a coating film component into a cleaning liquid when the coating film is removed from a surface of a coated film including the coating film on at least one surface of the base film, and as a result, have found the following coating film removing method and coating film removing equipment for a coated film.

The coating film of the coated film is preferably a coating film containing a water-soluble resin in consideration of an environmental load and the like. In particular, as the water-soluble resin, those containing at least one of a water-soluble polyester-based resin, a polyester urethane-based resin, an acrylic resin, an ethylene ionomer-based resin, a polyvinyl alcohol-based resin, a polyvinyl pyrrolidone-based resin, an ethylene-vinyl alcohol-based resin, and starch as a main component are more preferable. The coating film containing a water-soluble resin may be a single layer body containing a water-soluble resin, a layered product of two or more layers containing a water-soluble resin, or a layered product of a layer containing a water-soluble resin and a layer not containing a water-soluble resin.

As the coated film, a coating film-attached release film containing a release component in addition to a water-soluble resin in a part of the coating film is particularly preferable, and can efficiently exhibit a coating film removing effect. The release component mentioned here is a component that increases a contact angle of a coating film surface with respect to water, that is, reduces surface energy of the coating film. Examples of the release component include: a curable silicone resin such as a thermosetting silicone resin compound having dimethylsiloxane as a main skeleton or a UV-curable silicone resin compound cured by blending a photopolymerization initiator with an organopolysiloxane having an acryloyl group or a methacryloyl group and irradiating the blended product with UV light; a compound having a long chain alkyl group; and a compound having fluorine. In the coating film, the water-soluble resin and the release component may be mixed, or a layer containing the water-soluble resin and a layer containing the release component may be layered. In the case of the layered coating film, preferably, a layer containing the water-soluble resin is formed immediately above a base film, and then a layer containing the release component is formed on an outermost surface. As the release component, it is particularly preferable to use a thermosetting silicone resin compound having dimethylsiloxane having high water permeability as a main skeleton.

First Embodiment

A desirable embodiment of the coating film removing equipment of the present invention will be described with reference to the drawings. Note that the following description exemplifies one of embodiments according to the present invention, the present invention is not limited thereto, and various modifications can be made without departing from the gist of the present invention.

FIG. 1 is a schematic view of a coating film removing equipment 101 according to the first embodiment of the present invention. First, a configuration of the coating film removing equipment 101 of the present invention will be described. The coating film removing equipment 101 includes an unwinding device 4 that unwinds a coated film 1 and a winding device 5 that winds a base film 2 from which a coating film has been removed. The coating film removing equipment 101 further includes, between the unwinding device 4 and the winding device 5, a conveyance device 9 for the coated film 1 and the base film 2, a cleaning tank 15 that stores a cleaning liquid 16, a removing mechanism 19 that removes the coating film from the coated film 1, a backup roll 17 of the removing mechanism 19, and a suction box 18 surrounding a part of a conveyance film and the removing mechanism 19. The backup roll 17 and the suction box 18 form an inlet opening 20 which is a gap through which the coated film 1 passes, and an outlet opening 21 which is a gap through which the base film 2 passes. The coating film removing equipment 101 further includes a discharge pump 12 as a discharge device that discharges the cleaning liquid 16 and a removed coating film in the suction box, a liquid-feeding device 13 as a supply device that supplies the cleaning liquid 16 to the cleaning tank 15, and a supply nozzle 14.

A method for removing a coating film from the coated film 1 using the coating film removing equipment 101 configured as described above will be described. The coated film 1 has a coating film formed on one surface of the base film 2. First, the coated film 1 wound in a roll shape around a predetermined paper tube or the like is attached to the unwinding device 4. At this time, the coated film 1 is attached such that a coating film surface of the coated film 1 is located on a side to be in contact with the removing mechanism 19. Next, an edge of the coated film 1 is connected to a lead film that is wound around a paper tube of the winding device 5 in advance and passes through a film conveyance path by an appropriate means. The cleaning tank 15 is filled with the cleaning liquid 16 in advance. Next, while the conveyance device 9 is operated to convey the film, the coating film is removed by the removing mechanism 19, and the base film 2 is wound by the winding device 5. At this time, the cleaning liquid 16 and the coating film in the suction box 18 are sucked and discharged by the discharge pump 12, and the cleaning liquid 16 is supplied to the cleaning tank 15 using the liquid-feeding device 13 and the supply nozzle 14.

In order to stably convey the coated film 1 and the base film 2 from which the coating film has been removed, the conveyance device 9 preferably has a configuration capable of performing tension cut, and examples thereof include a configuration in which the conveyance device 9 is nipped by a metal drive roll and a rubber roll. In addition, since there is a high possibility that the cleaning liquid 16 is attached to the conveyance device 9, a stainless steel or surface-treated conveyance device is suitably used for the conveyance device 9 as a rust prevention measure.

As the removing mechanism 19, a resin plate or the like having a sharp edge in direct contact with the coated film 1 to be conveyed can be used. The removing mechanism 19 is not limited thereto. As the removing mechanism 19, a metal plate having a sharp edge may be disposed, or a resin or thin metal blade that is bent by being pressed against the coated film 1, such as a blade, may be disposed. Alternatively, a brush roll made of metal or resin may be brought into direct contact with a surface of the coating film of the coated film 1 by a mechanism that rotates the brush roll in the same direction as a conveyance direction or in the opposite direction, or the coating film may be wiped by pressing a waste cloth or a fabric against the coated film 1. In addition, in the coating film removing equipment 101 according to an embodiment of the present invention, the removing mechanism 19 is pressed against the coated film 1 at a position of the backup roll 17 supporting the coated film 1 to remove the coating film. However, the removing mechanism 19 may be pressed against a tensioned conveyance film at a position of a free span of the conveyed coated film 1 to remove the coating film. A position where the removing mechanism 19 is disposed may be any position as long as the coating film can be removed after the coated film 1 is immersed in the cleaning liquid 16 for a sufficient time, and is not limited to a bottom of the cleaning tank 15 as illustrated in FIG. 1. In addition, the removing mechanism 19 only needs to be disposed so as to face a surface of the coating film of the coated film 1, and the position where the removing mechanism 19 is disposed is not limited to a lower surface side as illustrated in FIG. 1. In addition, more preferably, the unwinding device 4 has a mechanism capable of coping with both an upward ejection and a downward ejection such that conveyance can be performed while a surface of the coating film of the coated film 1 faces the removing mechanism 19 by switching an unwinding direction of the coated film 1 so as to be able to cope with both a case where the coating film of the coated film 1 wound in a roll is located on an inner side of the roll and a case where the coating film of the coated film 1 wound in a roll is located on an outer side of the roll.

The suction box 18 is a device for keeping the removed coating film and a cleaning liquid 16a in which at least a part of the coating film component is eluted and a coating film component concentration is increased so as to prevent diffusion of the cleaning liquid 16a into the cleaning tank 15. By removing the coating film while sucking and discharging the coating film and the cleaning liquid 16a in the suction box 18 by the discharge pump 12, it is possible to suppress reattachment of the coating film to the base film 2 to be conveyed and an increase in coating film component concentration of the cleaning liquid 16 in the cleaning tank 15. At this time, when a flow rate of the cleaning liquid 16 flowing into the suction box 18 through the outlet opening 21 is small, the coating film or the cleaning liquid 16a having a high coating film component concentration in the suction box 18 may flow out from the outlet opening 21 due to an accompanying flow of the conveyance film. Therefore, the flow rate of the cleaning liquid at the outlet opening 21 is preferably larger than a speed of the conveyance film, and more preferably 1.5 times or more the speed of the conveyance film. When it is difficult to measure the flow rate of the cleaning liquid at the outlet opening 21, a value calculated from the shape of each opening such as the inlet opening 20, the outlet opening 21, or a gap between the backup roll 17 and the suction box 18 and a discharge amount by the discharge pump 12 can be substituted. Preferably, a flow volume passing through each opening is calculated on the basis of a theoretical formula of a pressure loss determined by the shape of each opening, and divided by the cross-sectional area of each opening to calculate the flow rate.

In addition, although the entire removing mechanism 19 is included in the suction box 18 in FIG. 1, the coating film removed by the removing mechanism 19 only needs to be retained in the suction box, and only an edge of the removing mechanism 19 may be in the suction box 18, and the other portion may be out of the suction box 18.

When the inlet opening 20 and the outlet opening 21 are too small, the inlet opening 20 and the outlet opening 21 may come into contact with the conveyance film when the conveyance film meanders or flutters. When the inlet opening 20 and the outlet opening 21 are too large, the flow rate at the outlet opening 21 is small, and the coating film and the cleaning liquid 16a including a high coating film component concentration in the suction box 18 easily flow out from the outlet opening 21 by an accompanying flow of the conveyance film. Therefore, the inlet opening 20 and the outlet opening 21 are preferably as small as possible so as not to come into contact with the conveyance film, and preferably determined appropriately according to the magnitude of meandering or fluttering of the conveyance film. For example, a distance between the film and the suction box at each of the openings is preferably 3 mm to 20 mm.

Figure 2:
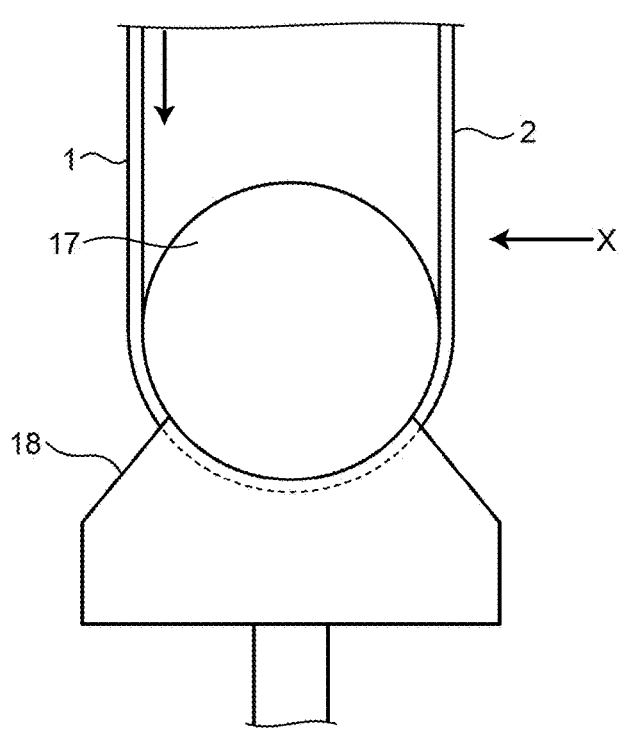
FIG. 2 is an enlarged view of a periphery of a suction box of the coating film removing equipment of FIG. 1.
Figure 3:
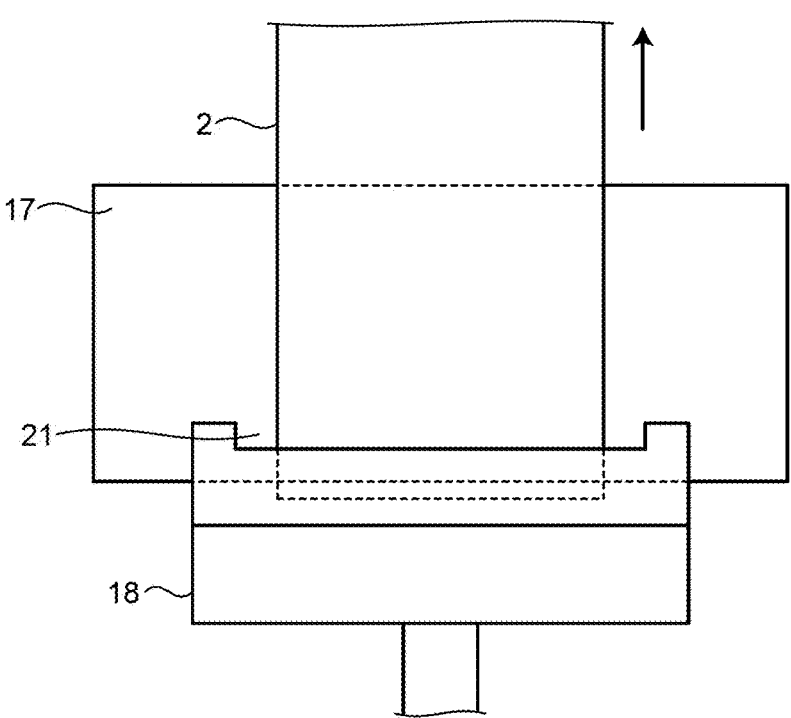
FIG. 3 is an arrow view of FIG. 2 as viewed in an X direction.

Here, the structure of the suction box 18 will be described in detail with reference to FIGS. 2 and 3. FIG. 2 is a partially enlarged view of a periphery of the suction box 18 of the coating film removing equipment of FIG. 1, and FIG. 3 is an arrow view of FIG. 2 as viewed in an X direction (downstream direction) (The removing mechanism 19 is not illustrated in FIGS. 2 and 3). As illustrated in FIGS. 2 and 3, both ends of the suction box 18 in a film width direction may be in contact with the backup roll 17, or may be in non-contact with the backup roll 17 by forming a gap therebetween. In a case of non-contact, the cleaning liquid also flows into the suction box 18 from the gap, and therefore a flow rate passing through the outlet opening 21 is small. Therefore, the gap is preferably as small as possible, and for example, a distance between the suction box 18 and the backup roll 17 at the gap is preferably 0.5 mm to 10 mm. The material of the suction box 18 is not particularly limited, but is preferably made of a metal or a resin having heat resistance and rust resistance. When the suction box is brought into contact with the backup roll 17, a material of a contact portion is preferably a material having slipperiness and low abrasion, such as polyacetal, polyamide, or polytetrafluoroethylene.

Figure 6:
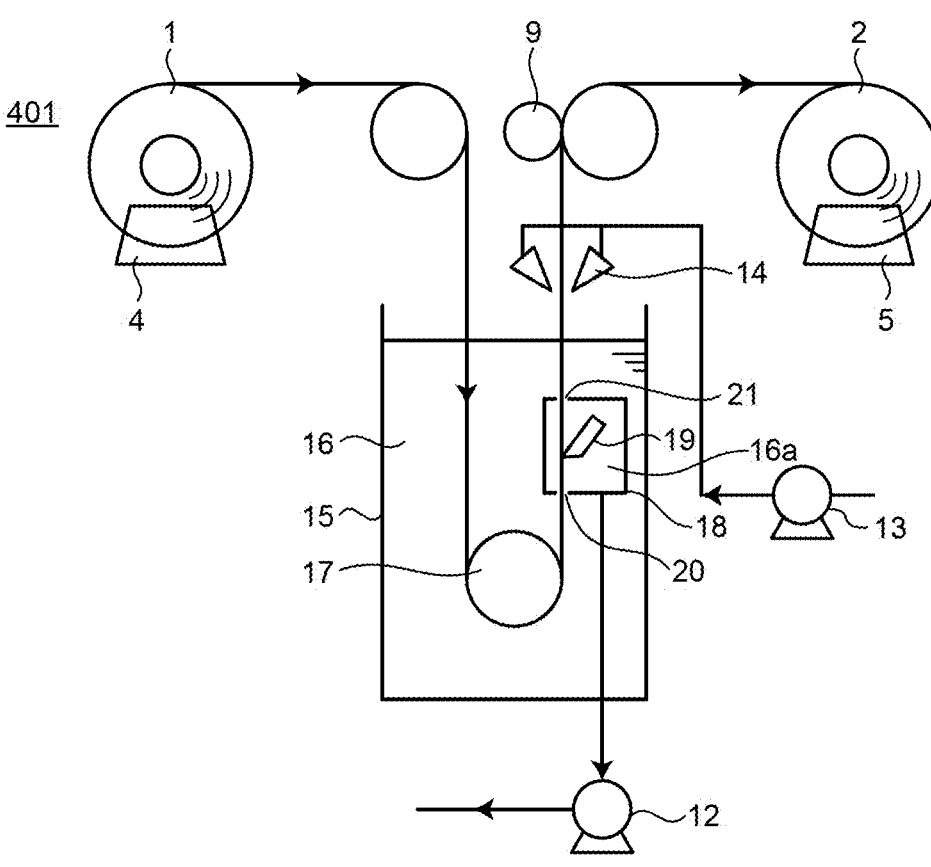
FIG. 6 is a schematic view of a coating film removing equipment 401 according to another embodiment of the present invention.

In FIG. 1, the suction box 18 surrounds the conveyance film and the removing mechanism 19 together with the backup roll 17, but the suction box 18 alone may surround the conveyance film and the removing mechanism 19. For example, FIG. 6 is a schematic view illustrating another embodiment of the present invention, and as illustrated in FIG. 6, a box-shaped suction box 18 may be disposed at a position of a free span of a film to be conveyed, and the film may be allowed to pass through an inlet opening 20 which is a gap through which a coated film 1 passes and an outlet opening 21 which is a gap through which a base film 2 passes.

The size of the suction box 18 is not particularly limited, but when the size is too large, it takes time to suck and discharge the coating film floating in the suction box 18, and the elution amount of a coating film component increases, which increases a coating film component concentration of the cleaning liquid. The size of the suction box 18 is preferably a size with which the discharge pump 12 can discharge the cleaning liquid having a volume surrounded by the suction box 18 within two minutes.

As the discharge pump 12, a liquid-feeding pump such as a diaphragm pump or a gear pump can be used. In order to suck and discharge not only the cleaning liquid 16 having a high coating film component concentration but also the coating film removed from the coated film 1, a hose pump capable of stably feeding a slurry is more preferable.

The supply nozzle 14 may be any nozzle such as a spray or a slit nozzle. When the cleaning liquid 16 is supplied to the cleaning tank 15, as illustrated in FIG. 1, by supplying the cleaning liquid 16a while spraying the cleaning liquid 16a onto the base film 2, even when the coating film is reattached to the base film 2, the coating film can be washed off, which is preferable. However, the cleaning liquid 16 discharged from a spray, a nozzle, or a pipe may be directly supplied to the cleaning tank 15 without spraying the cleaning liquid 16 onto the base film 2.

As the liquid-feeding device 13, a liquid-feeding pump capable of feeding the cleaning liquid 16 can be used. As the liquid-feeding pump, a pump similar to that used as the discharge pump 12 can be used.

The cleaning tank 15 is a tank that is filled with the cleaning liquid 16 and brings the cleaning liquid 16 into contact with a surface of the unwound coated film 1. The cleaning tank 15 may include a heating heater (not illustrated) for heating the cleaning liquid 16. A time during which the coated film 1 conveyed to the cleaning tank 15 is in contact with the cleaning liquid 16 before reaching the removing mechanism 19 is preferably long, and is preferably two seconds or more. In order to adjust the contact time, a roll may be disposed in the cleaning tank 15, and the coated film 1 may be folded back and conveyed in the cleaning tank 15.

The backup roll 17 is a roll for supporting the coated film 1 when the coating film is removed by the removing mechanism 19, and is preferably a smooth metal roll.

The unwinding device 4 is a device that unwinds the coated film 1, and fixes and attaches the coated film 1 wound in a roll shape around a paper tube or the like to a rotation shaft. The rotation shaft is connected to a powder clutch or the like, and has a structure capable of controlling idling of the coated film 1 at the time of unwinding.

The winding device 5 is a device that winds the base film 2, and preferably can control a winding tension with, for example, a torque motor so as to prevent sagging of the base film 2.

In the cleaning liquid 16, the higher the temperature, the faster an elution speed of the coating film component. That is, in order to improve a cleaning effect, the temperature of the cleaning liquid 16 is preferably 40° C. or higher. In order to suppress a dimensional change and flatness deterioration of the base film 2 due to heat, the temperature of the cleaning liquid 16 to be applied to the coated film 1 is preferably 150° C. or lower. Therefore, the cleaning liquid 16 is preferably 40° C. to 150° C. In addition, any solvent exhibits an effect thereof as long as the solvent can elute the coating film component, but water is preferably used in order to reduce an environmental load. For heating the cleaning liquid 16, the supply nozzle 14 may include a heat source such as a cartridge heater, or a tank (not illustrated) that stores the cleaning liquid 16 may be heated. However, any means may be used as long as the cleaning liquid 16 can be heated, and the means is not limited thereto. The material of the supply nozzle 14 preferably has heat resistance in order to discharge the heated cleaning liquid 16, and metal or a resin having heat resistance is suitably used.

It is more preferable to completely remove the cleaning liquid 16 from the base film 2 which has been wound by the winding device 5 and from which the coating film has been removed in order to stably form a film as a regenerated film after remelting the base film 2, and a drying device (not illustrated) may be disposed between the supply nozzle 14 and the winding device 5. The drying device only needs to be disposed before winding, and may be disposed either before or after the conveyance device 9.

In addition, in order to check the quality of the base film 2 from which the coating film has been removed, an inspection machine (not illustrated) that detects residues of the coating film and environmental foreign substances attached in the process may be disposed before the winding device 5. The inspection machine only needs to be selected according to the properties of the base film 2, and an inspection machine using transmitted light or reflected light is suitably used. In addition, a marking device (not illustrated) for recording the positions of residues of the coating film or environmental foreign substances attached in the process, detected by the inspection machine may be disposed between the inspection machine and the winding device 5. A marking method by the marking device may be any method as long as the position of a detection target can be marked, such as a pen, a seal, or a laser. By marking residues of the coating film or environmental foreign substances attached in the process, the marked place can be removed before remelting. Therefore, a regenerated film can be more stably formed, and deterioration in quality of the regenerated film can be prevented.

Second Embodiment

Figure 4:
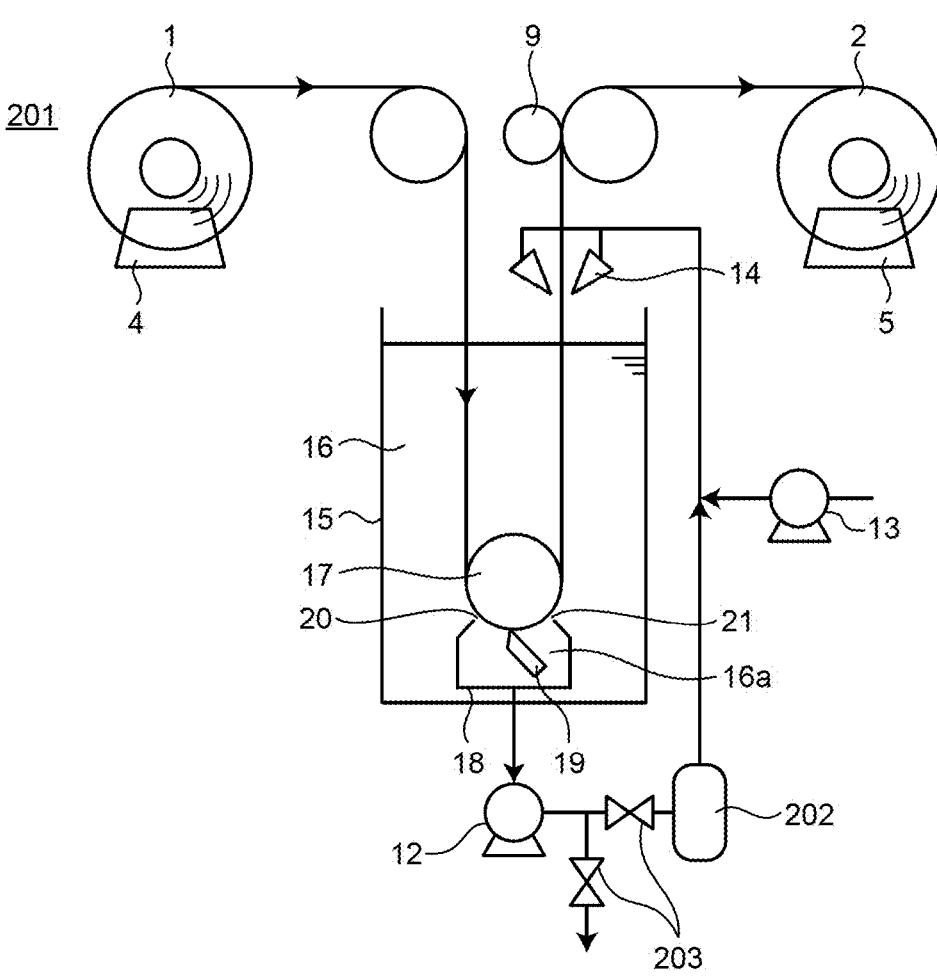
FIG. 4 is a schematic view of a coating film removing equipment 201 according to a second embodiment of the present invention.

FIG. 4 is a schematic view of a coating film removing equipment 201 according to a second embodiment of the present invention. The coating film removing equipment 201 includes a removal device 202, an adjustment valve 203, and a supply nozzle 14 in addition to a discharge pump 12 as a discharge device for a cleaning liquid 16*a* and a removed coating film from a suction box 18. In the present embodiment, since a discharge liquid discharged from the discharge pump 12 is reused and supplied to a cleaning tank 15, cost of the cleaning liquid can be further reduced than cost of the coating film removing equipment 101 of FIG. 1. In addition, when the discharge liquid is reused, foreign substances are removed by the removal device 202 from the discharge liquid discharged by the discharge pump 12, and then the discharge liquid is supplied to the cleaning tank 15 via the supply nozzle 14, whereby it is possible to suppress reattachment of the coating film to the base film 2.

Of the discharge liquid discharged by the discharge pump 12, the amount of the discharge liquid to be reused is preferably adjusted by the adjustment valve 203. At this time, the amount of the cleaning liquid in the cleaning tank 15 is preferably kept constant by supplying the fresh cleaning liquid 16 in the same amount as the discharge liquid which has not been reused from a liquid-feeding device 13 to the cleaning tank 15 via the supply nozzle 14. The larger the amount of the discharge liquid to be reused, the higher a coating film component concentration of the cleaning liquid 16 in the cleaning tank 15 and the lower removing ability. Therefore, the amount of the discharge liquid to be reused is preferably determined so as to satisfy required removing ability while checking a removing state of the base film 2.

The removal device 202 is a device for removing the coating film from the discharge liquid, and a filter, a continuous centrifuge, or the like can be used. When a filter is used, the coating film component is eluted from the coating film captured over time into the cleaning liquid flowing through the filter, which causes an increase in coating film component concentration in the cleaning liquid to be supplied to the cleaning tank 15. Therefore, the filter is preferably replaced periodically.

Since the other components are the same as those of the coating film removing equipment 101 of FIG. 1, description of the components common to those of the coating film removing equipment 101 is omitted.

Third Embodiment

Figure 5:
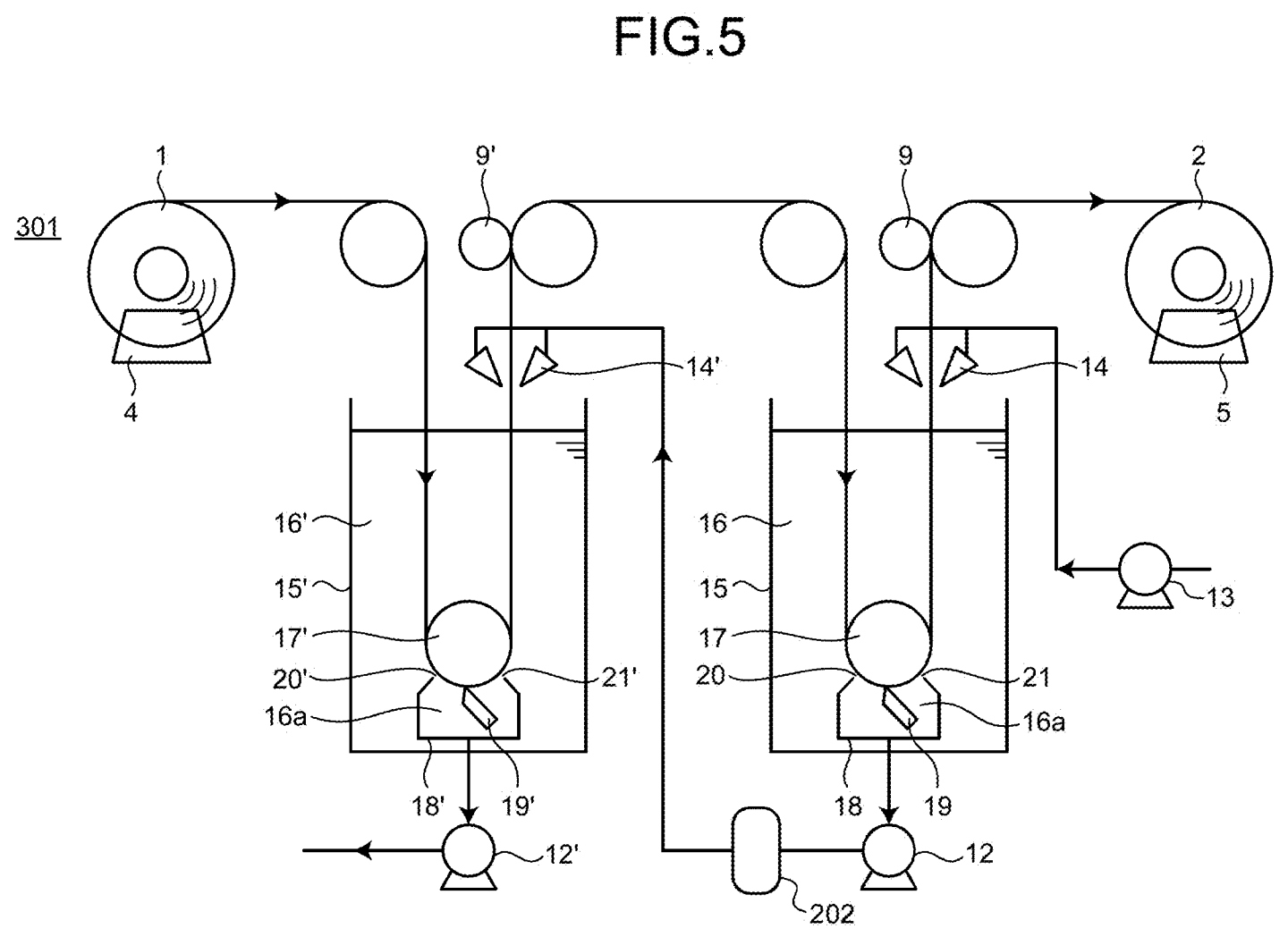

FIG. 5 is a schematic view of a coating film removing equipment 301 according to a third embodiment of the present invention. The coating film removing equipment 301 includes, between an unwinding device 4 and a winding device 5, conveyance devices 9 and 9' for a coated film 1 and a base film 2, cleaning tanks 15 and 15' that store cleaning liquids 16 and 16', respectively, removing mechanisms 19 and 19' that remove a coating film from the coated film 1, backup rolls 17 and 17', suction boxes 18 and 18' that surround a part of a conveyance film and the removing mechanisms 19 and 19', respectively, inlet openings 20 and 20' which are gaps through which the coated film 1 passes, outlet openings 21 and 21' which are gaps through which the base film 2 passes, discharge pumps 12 and 12' that discharge the cleaning liquids 16 and 16' and the removed coating film in the suction boxes, and supply nozzles 14 and 14'. The backup roll 17' and the suction box 18' form the inlet opening 20' and the outlet opening 21' which are gaps through which the coated film 1 passes, and the backup roll 17 and the suction box 18 form the inlet opening 20 which is a gap through which the coated film 1 passes and the outlet opening 21 through which the base film 2 passes.

In the present embodiment, a discharge liquid discharged from the cleaning tank 15 on a downstream side by the discharge pump 12 is reused and supplied to the cleaning tank 15' on an upstream side via the supply nozzle 14'. At this time, the entire discharge liquid may be reused, or only a part thereof may be reused. When only a part is reused, an adjustment valve is preferably disposed on an upstream side of a removal device 202 to adjust the amount of the discharge liquid to be reused as in the coating film removing equipment 201 of FIG. 4. At this time, a fresh cleaning liquid may be supplied to the cleaning tank 15' by another supply means or the discharge amount of the discharge pump 12' may be adjusted such that the cleaning liquid amount of the cleaning tank 15' is constant. In the present embodiment, since the coating film of the coated film 1 is removed in two stages of the removing mechanisms 19 and 19', the amount of removing per time can be reduced. As a result, the amount of the coating film generated in the suction boxes 18 and 18' is small, and a coating film removing effect can be maintained high by further suppressing reattachment of a removed coating film to the base film 2 and an increase in coating film component concentration in the cleaning liquid in the cleaning tank 15 on a downstream side.

In addition, the removing mechanism 19 and the removing mechanism 19' do not need to be the same, and the suction box 18 and the suction box 18' do not need to be the same. For example, either one of the suction boxes 18 and 18' may have a structure of a suction box illustrated in FIG. 6.

Since the other components are the same as those of the coating film removing equipment 101 of FIG. 1 and the coating film removing equipment 201 of FIG. 4, description of common components is omitted.

EXAMPLES

Hereinafter, the present invention will be described with reference to Examples, but the present invention is not necessarily limited thereto.
<Coated Film>
On a polyethylene terephthalate base film having a thickness of 30 µm and a width of 300 mm, a polyvinyl alcohol resin coating film having a thickness of 0.1 µm was formed as a layer containing a water-soluble resin. On the polyvinyl alcohol resin coating film, a curable silicone resin coating film having a thickness of 0.1 µm was further formed as a layer containing a release component to prepare a coated film.
<Method for Evaluating Removing>
Evaluation of removing was measured by the following method using a commercially available dyne pen (surface energy: 30 or 70 mN/m). When a pattern was drawn on a sample surface with a dyne pen in an environment of a room temperature of 23° C. and the state was maintained for four seconds or more, it was determined that surface energy of the sample surface was higher than surface energy of the dyne pen. When the curable silicone resin as the release component of the coated film remains on the surface, the surface energy is less than 30 mN/m. Therefore, a reagent of any dyne pen is repelled on the sample surface, and the drawn pattern cannot be retained. On the other hand, when the coating film of the curable silicone resin as the release component is removed and the polyvinyl alcohol resin is exposed, the surface energy is 70 mN/m or more. Therefore, any dyne pen can retain the drawn pattern. When the coating films of the curable silicone resin as the release component and the water-soluble polyvinyl alcohol resin are both removed and polyethylene terephthalate is exposed, the surface energy is 43.8 mN/m. Therefore, the drawn pattern of the 30 mN/m dyne pen is retained, but the drawn pattern of the 70 mN/m dyne pen cannot be retained. Whether or not the coating film of the coated film could be removed was determined by the above evaluation method.
<Method for Evaluating Reattachment of Foreign Substance to Film>
Behavior of the removed coating film was visually observed, and presence or absence of reattachment of the removed coating film to the base film was checked. In addition, the number of removed coating films reattached to the base film and brought into the winding unit was counted by a line camera disposed immediately before the winding unit, the number of removed coating films brought into a collected film per 100 m of film traveling was calculated from a film conveyance speed and a travel time, and it was determined whether or not mixing of the removed coating films into the collected film due to reattachment of the removed coating films could be suppressed.
<Removing of Coating Film from Coated Film>

Example 1

The coating film of the coated film 1 was removed using the coating film removing equipment 101 illustrated in FIG. 1. The coated film 1 was set in the unwinding device 4 of the coating film removing equipment 101, conveyed to the cleaning tank 15 at a conveyance speed of 50 m/min by the conveyance device 9, and brought into contact with warm water (40° C.) as the cleaning liquid 16. Next, the coating film was removed by bringing the coating film into contact with a plastic doctor blade (Hi-POM series manufactured by FUJI SHOKO CO., LTD., thickness: 1.25 mm) having a sharp resin edge as the removing mechanism 19, and the base film 2 from which the coating film had been removed was wound by the winding device 5. At this time, the amount of the cleaning liquid in the cleaning tank was set such that a time during which the coated film 1 conveyed to the cleaning tank 15 was in contact with the cleaning liquid 16 before reaching the removing mechanism 19 was two seconds. The suction box 18 was made of polytetrafluoroethylene, and as illustrated in FIG. 5, both ends of the suction box 18 in a film width direction were brought into contact with the backup roll 17. The inlet opening 20 and the outlet opening 21 each had a quadrangular shape, and each had a length of 320 mm in a film width direction and a length of 5 mm in a film thickness direction. The supply amount of the cleaning liquid 16 by the liquid-feeding device 13 and the discharge amount of the cleaning liquid 16a by the discharge pump 12 were each 0.18 m³/min, and at this time, a calculated value of a flow rate of the cleaning liquid 16 at the outlet opening 21 was 56 m/min.

The coating film was continuously removed for ten minutes using the present device and then the base film was checked. As a result, both the coating films of the curable silicone resin as the release component and the water-soluble polyvinyl alcohol resin could be removed. In addition, the number of coating films reattached to the base film was 2.

Example 2

As illustrated in FIG. 4, the coating film was removed by the same device as in Example 1 except that a part of a discharge liquid discharged from the discharge pump 12 was filtered by the removal device 202 and then supplied to the cleaning tank 15 for reuse. As the removal device 202 for removing the coating film, a continuous centrifuge (SSE20 manufactured by GEA Japan Ltd.) was used. In addition, the adjustment valve 203 was adjusted such that 30% of the discharge liquid was reused and the remaining 70% was discarded, and the same amount of a fresh cleaning liquid as the discarded discharge liquid was fed from the liquid-feeding device 13.

While the other conditions were the same as in Example 1, the coating film was continuously removed for ten minutes, and then the base film was checked. As a result, the coating films of the curable silicone resin as the release component and the water-soluble polyvinyl alcohol resin were both removed. In addition, the number of coating films reattached to the base film was 2.

Example 3

The coating film of the coated film 1 was removed using the coating film removing equipment 301 illustrated in FIG. 5. The same devices as in Example 1 were used for the unwinding device 4, the winding device 5, the conveyance devices 9 and 9', the cleaning tanks 15 and 15', the removing mechanisms 19 and 19', the backup rolls 17 and 17', the suction boxes 18 and 18', the discharge pumps 12 and 12', the liquid-feeding device 13, and the supply nozzles 14 and 14' constituting the coating film removing equipment 301. The same continuous centrifuge as in Example 2 was used as the removal device 202.

The coating film was removed under the same conditions as in Example 1 except that the amount of the cleaning liquid in the cleaning tank was set such that a time during which the coated film 1 conveyed to the cleaning tanks 15 and 15' was in contact with the cleaning liquids 16 and 16' before reaching the removing mechanism 19 and 19', respectively, was one second. At this time, a calculated value of a flow rate of the cleaning liquid at each of the outlet openings 21 and 21' was 56 m/min.

The coating film was continuously removed for ten minutes using the present device and then the base film was checked. As a result, both the coating films of the curable silicone resin as the release component and the water-soluble polyvinyl alcohol resin could be removed. In addition, the number of coating films reattached to the base film was 0.

Example 4

A conveyance speed was 70 m/min, and the inlet opening 20 and the outlet opening 21 each had a length of 3.6 mm in a film thickness direction. A time during which the coated film 1 conveyed to the cleaning tank 15 was in contact with the cleaning liquid 16 before reaching the removing mechanism 19 was 1.4 seconds. The coating film was removed in the same manner as in Example 1 except for the above. At this time, a calculated value of a flow rate of the cleaning liquid at the outlet openings 21 was 78 m/min.

The coating film was continuously removed for ten minutes using the present device and then the base film was checked. As a result, the curable silicone resin as the release component could be removed, but the coating film of the water-soluble polyvinyl alcohol resin remained. In addition, the number of coating films reattached to the base film was 8.

Example 5

A conveyance speed was 70 m/min, and the inlet openings 20 and 20' and the outlet openings 21 and 21' each had a length of 3.6 mm in a film thickness direction. A time during which the coated film 1 conveyed to the cleaning tank 15 was in contact with the cleaning liquid 16 before reaching the removing mechanism 19 was 1.4 seconds. The coating film was removed in the same manner as in Example 3 except for the above. At this time, a calculated value of a flow rate of the cleaning liquid at each of the outlet openings 21 and 21' was 78 m/min.

The coating film was continuously removed for ten minutes using the present device and then the base film was checked. As a result, both the coating films of the curable silicone resin as the release component and the water-soluble polyvinyl alcohol resin could be removed. In addition, the number of coating films reattached to the base film was 0.

Example 6

The coating film was removed in the same manner as in Example 1 except that the inlet opening 20 and the outlet opening 21 each had a length of 7 mm in a film thickness direction. At this time, a calculated value of a flow rate of the cleaning liquid at the outlet openings 21 was 40 m/min.

The coating film was continuously removed for ten minutes using the present device and then the base film was checked. As a result, the curable silicone resin as the release component could be removed, but the coating film of the water-soluble polyvinyl alcohol resin remained. In addition, the number of coating films reattached to the base film was 7.

Example 7

The coating film was removed in the same manner as in Example 1 except that the inlet opening 20 and the outlet opening 21 each had a length of 3.6 mm in a film thickness direction. At this time, a calculated value of a flow rate of the cleaning liquid at the outlet openings 21 was 78 m/min.

The coating film was continuously removed for ten minutes using the present device and then the base film was checked. As a result, both the coating films of the curable silicone resin as the release component and the water-soluble polyvinyl alcohol resin could be removed. In addition, the number of coating films reattached to the base film was 0.

Comparative Example 1

The coating film was removed in the same manner as in Example 1 except that the suction box 18 was not disposed and the cleaning liquid and the removed coating film in the cleaning tank 15 were discharged from a bottom surface of the cleaning tank 15 by the discharge pump 12.

When the coating film was removed using the present device, the coating film was floating in the cleaning tank from an initial stage of removing. The coating film was continuously removed for five minutes as it was and then the base film was checked. As a result, the curable silicone resin as the release component could be removed, but the coating film of the water-soluble polyvinyl alcohol resin remained. In addition, the number of coating films reattached to the base film was 40. When the coating film was further continuously removed for five minutes (that is, when the coating film was continuously removed for ten minutes after the start of removing), the number of coating films floating in the cleaning tank increased, and the number of coating films reattached to the base film was 300. Both the polyvinyl alcohol resin and the curable silicone resin remained on the base film.

The coating film removing results of the coated films in the above Examples and Comparative Example are summarized in Table 1. In whether or not coating film removing occurred in the Table, "Coating film removing occurred" means that both the polyvinyl alcohol resin and the curable silicone resin which are coating films on the base film were removed from the base film, and the coated film was separated into the coating films and the base film. In addition, "Part of coating film remained" means that, out of the coating films on the base film, only the curable silicone resin located on a surface layer was removed, and the polyvinyl alcohol resin remained on the base film and was not separated from the base film. In addition, "Coating film remained" means that both the polyvinyl alcohol resin and the curable silicone resin which are coating films on the base film remained on the base film, and the coating films were not separated from the base film.

cleaning liquid in the suction box as in Examples 1 to 3 in order to suppress reattachment of the removed coating film and deterioration of removing ability due to elution of at least a part of the coating film component into the cleaning liquid.

Comparison Between Examples 1 and 2

Example 2 had performance equal to Example 1 in the evaluation of whether or not coating film removing occurred and the number of coating films reattached although the amount of a fresh cleaning liquid used was reduced in Example 2 as compared with Example 1. From this, it has been demonstrated that by filtering the discharge liquid discharged from the discharge pump by the removal device and supplying the filtered discharge liquid to the cleaning tank, cost of the cleaning liquid can be reduced while maintaining the above performance.

Comparison Among Examples 1, 3, 4, and 5

In Example 3 in which two cleaning tanks were used, it was possible to visually confirm that the amount of the coating film floating in the cleaning tank was smaller and the number of coating films reattached was smaller than those in Example 1 in which one cleaning tank was used. In addition, in Examples 4 and 5 in which both conveyance speeds were increased, it was confirmed that Example 5 in which two cleaning tanks were used was superior to Example 4 in which one cleaning tank was used in not only the number of coating films reattached but also evaluation of whether or not coating film removing occurred. From this, it has been demonstrated that by performing removing using a plurality

TABLE 1

| | Conveyance speed [m/min] | Flow rate at outlet opening [m/min] | Whether or not coating film removing occurred ○: Coating film removing occurred Δ: Part of coating film remained x: Coating film remained | Number of removed coating films reattached [pieces/100 m] |
|---|---|---|---|---|
| Example 1 | 50 | 56 | ○ | 2 |
| Example 2 | 50 | 56 | ○ | 2 |
| Example 3 | 50 | 56 | ○ | 0 |
| Example 4 | 70 | 78 | Δ | 8 |
| Example 5 | 70 | 78 | ○ | 0 |
| Example 6 | 50 | 40 | Δ | 7 |
| Example 7 | 50 | 78 | ○ | 0 |
| Comparative Example 1 | 50 | — | After lapse of 5 minutes: Δ After lapse of 10 minutes: x | After lapse of 5 minutes: 40 After lapse of 10 minutes: 300 |

Comparison Between Examples 1 to 3 and Comparative Example 1

It could be confirmed that Examples 1 to 3 of the present invention were superior to Comparative Example 1 as a conventional technique in the evaluation of whether or not coating film removing occurred and the number of coating films reattached, and in Examples 1 to 3, there was no decrease in coating film removing performance or increase in the number of coating films reattached to the base film due to lapse of the removing treatment time. From this, it has been demonstrated that it is important to dispose a suction box and to suck and remove the coating film and the of cleaning tanks, it is possible to suppress reattachment of the removed coating film to the base film and to suppress an increase in the concentration of the coating film component in the cleaning tank on a downstream side to suppress deterioration of removing ability.

Comparison Among Examples 1, 6, and 7

It was confirmed that Example 1 in which the flow rate at the outlet opening was larger than the conveyance speed was better in the evaluation of whether or not coating film removing occurred and the number of coating films reattached than that in Example 6 in which the flow rate at the outlet opening was smaller than the conveyance speed. In addition, in Example 7 in which the flow rate at the outlet opening was further increased to a value 1.5 times or more the conveyance speed, the number of coating films reattached was further reduced. From this, it has been demonstrated that it is important to increase the flow rate at the outlet opening in order to suppress reattachment of the removed coating film and deterioration of removing ability due to elution of the coating film into the cleaning liquid.

INDUSTRIAL APPLICABILITY

The present invention can be applied to a coating film removing equipment and a coating film removing method from a coated film in which a coating film is formed on a base film such as a resin film, a paper film, or a metal film, but the present invention is not limited to these applications.

REFERENCE SIGNS LIST

1 COATED FILM
2 BASE FILM
4 UNWINDING DEVICE
5 WINDING DEVICE
9 CONVEYANCE DEVICE
12, 12' DISCHARGE PUMP
13 LIQUID-FEEDING DEVICE
14, 14' SUPPLY NOZZLE
15, 15' CLEANING TANK
16, 16', 16a CLEANING LIQUID
17, 17' BACKUP ROLL
18, 18' SUCTION BOX
19, 19' REMOVING MECHANISM
20, 20' INLET OPENING
21, 21' OUTLET OPENING
101, 201, 301, 401 COATING FILM REMOVING EQUIPMENT
202 REMOVAL DEVICE
203 ADJUSTMENT VALVE

The invention claimed is:
1. A coating film removing equipment for removing a coating film from a coated film including the coating film on at least one surface of a base film, the coating film removing equipment comprising:
  two or more cleaning tanks disposed side by side in a conveyance direction of the coated film;
  a supply device configured to supply a cleaning liquid to at least the cleaning tank disposed most downstream in the conveyance direction;
  a conveyance device configured to convey the coated film in a longitudinal direction of the coated film such that the coated film sequentially passes through the cleaning tanks;
  suction boxes each disposed in each of the cleaning tanks, each suction box being configured to surround a part of a conveyance path of the coated film with a gap through which a film can pass;
  removing mechanisms each in which at least an edge in contact with the coated film is disposed in each of the suction boxes, each removing mechanism being configured to remove the coating film from the coated film; and
  discharge devices each for discharging the cleaning liquid and the removed coating film from each of the suction boxes to an outside of each of the cleaning tanks, wherein at least one of the discharge devices includes a removal device for removing a foreign substance from a discharge liquid, and is configured to supply the discharge liquid from which the foreign substance has been removed to another cleaning tank disposed on an upstream side of the cleaning tank including the discharge device in the conveyance direction.
2. A coating film removing equipment for removing a coating film from a coated film including the coating film on at least one surface of a base film, the coating film removing equipment comprising:
  a cleaning tank;
  a supply device configured to supply a cleaning liquid to the cleaning tank;
  a conveyance device configured to convey the coated film in a longitudinal direction of the coated film such that the coated film passes through the cleaning tank;
  a suction box disposed in the cleaning tank, the suction box being configured to surround a part of a conveyance path of the coated film with a gap through which a film can pass;
  a removing mechanism in which at least an edge in contact with the coated film is disposed in the suction box, the removing mechanism being configured to remove the coating film from the coated film; and
  a discharge device for discharging the cleaning liquid and the removed coating film from the suction box to an outside of the cleaning tank.
3. The coating film removing equipment according to claim 2, wherein the discharge device includes a removal device for removing a foreign substance from a discharge liquid, and is configured to supply the discharge liquid from which the foreign substance has been removed to the cleaning tank.
4. A coating film removing method for removing a coating film from a coated film including the coating film on at least one surface of a base film, the coating film removing method comprising:
  disposing two or more cleaning tanks side by side in a conveyance direction of the coated film;
  supplying a cleaning liquid to at least the cleaning tank disposed most downstream in the conveyance direction;
  conveying the coated film in a longitudinal direction of the coated film such that the coated film sequentially passes through the cleaning liquid in the cleaning tanks;
  introducing the coated film into suction boxes each disposed in the cleaning liquid in each of the cleaning tanks, each suction box having a gap through which a film can pass, and removing the coating film by a coating film removing mechanism in the suction box;
  discharging the cleaning liquid and the removed coating film in each of the suction boxes to an outside of each of the cleaning tanks; and
  removing a foreign substance from a discharge liquid discharged from at least one of the suction boxes, and then supplying the discharge liquid from which the foreign substance has been removed to another cleaning tank disposed on an upstream side of the cleaning tank including the at least one of suction boxes in the conveyance direction.
5. The coating film removing method according to claim 4, wherein a discharge amount of the discharge liquid from the suction box is set such that a flow rate of the cleaning liquid at the gap through which the coated film in the suction box goes out is larger than a conveyance speed of the coated film.

6. A coating film removing method for removing a coating film from a coated film including the coating film on at least one surface of a base film, the coating film removing method comprising:

supplying a cleaning liquid to a cleaning tank;

conveying the coated film in a longitudinal direction of the coated film such that the coated film passes through the cleaning liquid;

introducing the coated film into a suction box disposed in the cleaning liquid, the suction box having a gap through which a film can pass, and removing the coating film by a coating film removing mechanism in the suction box; and discharging the cleaning liquid and the removed coating film in the suction box to an outside of the cleaning tank.

7. The coating film removing method according to claim 6, wherein a foreign substance is removed from a discharge liquid discharged from the suction box, and then the discharge liquid from which the foreign substance has been removed is supplied to the cleaning tank.

8. The coating film removing method according to claim 6, wherein a discharge amount of the discharge liquid from the suction box is set such that a flow rate of the cleaning liquid at the gap through which the coated film in the suction box goes out is larger than a conveyance speed of the coated film.

*    *    *    *    *